Fig. 5. STATION V

Fig. 6. STATION VII

INVENTOR
Clarence W. Vogt

Oct. 3, 1961 C. W. VOGT 3,002,325
APPARATUS FOR FORMING AND FILLING PACKAGES
Original Filed Sept. 21, 1956 8 Sheets-Sheet 7

INVENTOR
Clarence W. Vogt
his ATTORNEYS.

United States Patent Office 3,002,325
Patented Oct. 3, 1961

3,002,325
APPARATUS FOR FORMING AND FILLING PACKAGES
Clarence W. Vogt, Kettlecreek Road, Weston, Conn.
Continuation of application Ser. No. 611,231, Sept. 21, 1956. This application Apr. 8, 1959, Ser. No. 804,899
31 Claims. (Cl. 53—124)

This invention relates to the art of packaging and more particularly to the method of packaging comminuted flowable material that is form retaining, yet moldable when packaged and readily disturbed, such as flour, pancake or cake mixes, gelatinous materials or the like, as well as to the equipment for forming such packages.

This is a continuation of my U.S. application Serial No. 611,231, filed September 21, 1956, now forfeited, which is a continuation-in-part of copending applications Serial Nos. 594,152, filed June 27, 1956, and Serial No. 599,632, filed July 23, 1956.

As conducive to an understanding of the invention, it is noted that for ease in handling and economy of storage, it is desirable that packages be rectangular in shape, preferably in the form of a parallelepiped. Where individual packages are formed that are triangular in cross section and which are then juxtaposed to form a package that is rectangular in cross section, the packaging operation is much more time consuming than it would be if the rectangular package were formed in a single operation and in addition would require much more wrapping material.

Where a container is formed from sheet material and requires mechanism for end folding the material, the forming operation is time consuming and adds greatly to the cost of the finished package. In addition, there is the likelihood that some of the material being packaged will be trapped between the end folds with resultant waste when the package is emptied.

Where containers are formed from sheet plastic that is molded into rectangular form with lateral fins for sealing of a cover member thereon and the sheet must be relatively thick to permit stretching to the desired shape without rupture, as the fin portion, which is unstretched, would be relatively thick, it could not be bent flush against the container and might crack or tear. As a result, in assembling a multi-unit package having a number of individual containers, as they cannot be closely juxtaposed, the multi-unit packages would have relatively great bulk. In addition, the cost of the relatively thick plastic sheet adds greatly to the overall cost of the completed package.

Where the equipment forms a container and fills and seals the latter and each of such steps is performed intermittently rather than continuously, the number of containers that can be formed, filled and sealed in a given period is correspondingly limited.

It is accordingly among the objects of the invention to provide a relatively simple method and comparatively simple equipment for continuously forming, filling and sealing containers made from relatively thin, inexpensive sheet plastic material, which equipment will operate at a relatively high rate of speed without likelihood of derangement.

Another object is to provide a method and equipment of the above type for filling the containers with material that is moldable and readily disturbed when in packaged form yet becomes compacted so as to be form retaining when packaged.

Another object is to provide a method and equipment of the above type which will form packages substantially in the form of a parallelepiped having fin seals that may readily be bent to be flush against the body of the package without likelihood of rupture or cracking for facility in forming multi-unit packages in a minimum space and which package is without end folds, thereby dispensing with the need for mechanism for this purpose and avoiding the possibility of trapping of some of the material that is packaged.

Another object is to provide a method and equipment for forming packages of the above type with reinforcement members which prevent deformation of the completed package.

Another object is to provide a package of the above type that may readily be opened without the use of extra pull-strips, perforation or tearing of the plastic material and without deformation of the package except for the portion thereof which is opened.

According to the invention, the container comprises trough-shaped base and cover members of relatively thin sheet plastic, each of said members having a fin extending laterally from the mouth thereof. The base and cover members are preferably triangular in cross section and of complementary configuration so that when juxtaposed they will form substantially a parallelepiped.

In a preferred embodiment a U-shaped reinforcement member has its cross piece extending parallel to a side wall of one of the members and has its legs extending parallel to and lying flush against the end walls of the base and cover members.

The equipment for forming said packages desirably comprises means for forming the trough-shaped base member by deforming a sheet of plastic to the desired shape. Suitable filling means are provided to force a charge of form retaining yet moldable material into the trough of the base member so that it fills such trough in compacted form and protrudes beyond the mouth of the latter also in compacted form. The equipment has means for forming a trough-shaped cover member of configuration complementary to the protruding portion of the material being packaged and positioning such cover member over such material so that pressure may thereupon be exerted against juxtaposed lateral fins on the base and cover members to seal them together without disturbing the contents of the container defined by the base and cover members.

More particularly an endless conveyor is provided which carries a multiplicity of molding elements through the various steps of a complete cycle of operation. At the first station, a continuous strip of plastic material is applied over the cavities in the molding element as the latter are advanced and while retained thereagainst, heat is applied to soften such plastic so that upon application of suction to the molding elements, the softened sheet may be drawn into the cavities to line the latter to form the base member.

Thereupon at a reinforcement insertion station, a reinforcement member is formed and inserted into the lined cavities as they are advanced by the conveyor. After this operation is performed, at a cutting station following the reinforcement insertion station, the strip of plastic material is severed between successive molding elements.

The molding elements thus lined and with the strip severed are fed by the conveyor to a filling station where a charge of material is forced into the lined cavities from a magazine rotating in synchronization with the moving molding elements. Thereupon the charged molding elements are moved away from the magazine and advanced to a cover member forming station.

At this station a strip of plastic material is positioned over cavities in a plurality of cover member forming elements and such strip is heated and softened so that it may be drawn into the cover member forming element to form the cover member. Such cover members are successively applied over the charged cavities in the base member forming elements and the periphery of such cover member and base member are bonded together.

Further movement of the conveyor advances the semi-formed packages to a second cutting station where the strips of plastic material forming the base and cover members are severed between adjacent cavities in the base member forming element and between adjacent base member forming elements to complete the package.

Thereupon the completed packages are removed from the base member forming elements and deposited upon a suitable conveyor.

In the accompanying drawings in which are shown one or more of various possible embodiments of the several features of the invention.

FIG. 5b is a fragmentary side elevational view taken along line 5b—5b of FIG. 5a;

In the illustrative embodiment of the invention herein shown and described, the packages formed by the equipment comprises a container 20 (FIGS. 19 and 20) having a base member 21 and a cover member 22, each desirably formed from a relatively thin sheet of thermoplastic material such as "Saran," polyethylene, polyvinyl resin or the like. The base and cover members 21 and 22 are trough-shaped as shown, each illustratively triangular in cross section having side walls 23, 24 and 25, 26 extending from their apices 27, 28 and substantially parallel end walls 29, 31. The mouths 32, 33 of the base and cover member are desirably of the same size and each has an outstanding peripheral fin 34, 35 which is an integral part thereof.

Figures 19, 20, 21, 22:
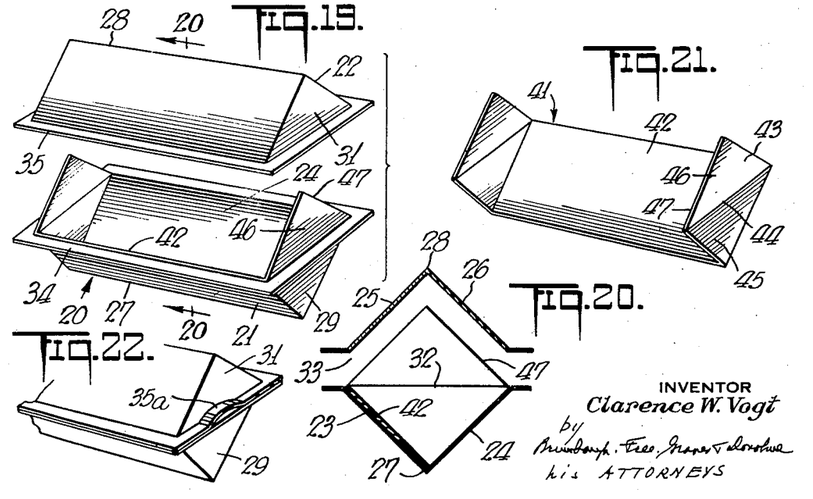
FIG. 19 is an exploded perspective view of a container.
FIG. 20 is a sectional view taken along line 20—20 of FIG. 19.
FIG. 21 is a perspective view of a reinforcement member.
FIG. 22 is a fragmentary perspective view of the container showing the pull tab.

When the base and cover members 21 and 22 are juxtaposed with their fins 34, 35 in engagement and secured together to form fin seals, a parallelepiped will be formed having fin seals along the side walls thereof and extending diametrically across the end walls thereof.

In the preferred embodiment of the package shown, a portion of the fin 35 of the cover member 22 at the end thereof as at 35a is not sealed to the associated portion of fin 34 of base member 21 to provide an integral tab for ready opening of the completed package in the manner hereinafter described.

Desirably the base and cover members 21 and 22 are of complementary configuration so that the resultant package will be square in cross section.

In order to prevent deformation of the package in the case of packaging comminuted and flowable form retaining, but deformable material such as flour, cake mixes, gelatinous mixtures and the like, a reinforcement member is desirably provided. This member, as shown in FIG. 21 is a relatively stiff substantially U-shaped strip of cardboard, for example, having a substantially rectangular cross piece 42 desirably coextensive with a side wall of one of the trough-like members 21 and 22 and rectangular legs 43 desirably coextensive with the end wall of the completed container, said end walls 43 desirably being diagonally scored as at 44 to permit ready bending thereof for facility of removal of the container in the manner hereinafter described from the mold in which it is filled.

In the embodiment shown in FIGS. 19 and 20, the cross piece is positioned in the base member 21 so as to extend parallle to and rest against the side wall 23 thereof. With the cross piece so positioned the portion 45 of the legs 32 between the score line 44 and the apex 27 of the base member will rest against the end wall 29 and the portion 46 of the legs 43 above the score line 44 will extend beyond the mouth 32 of base member 21 and rest against the end walls 31 of the cover member 22, the ends 47 of legs 43 resting against the side wall 26 of the cover member adjacent the end wall 31 thereof.

The width of legs 43 at the ends 47 thereof preferably is slightly less than its width at its opposed end so that the protruding portion 46 will be slightly tapered to facilitate removal from the mold in which the package is formed.

Referring now to FIGS. 1 to 18 of the drawings, the various components of an automatic equipment for continuously forming, filling and sealing the container shown in FIG. 19 will be described in detail.

*Conveyor unit (FIGS. 1 to 3)*

Figure 1:
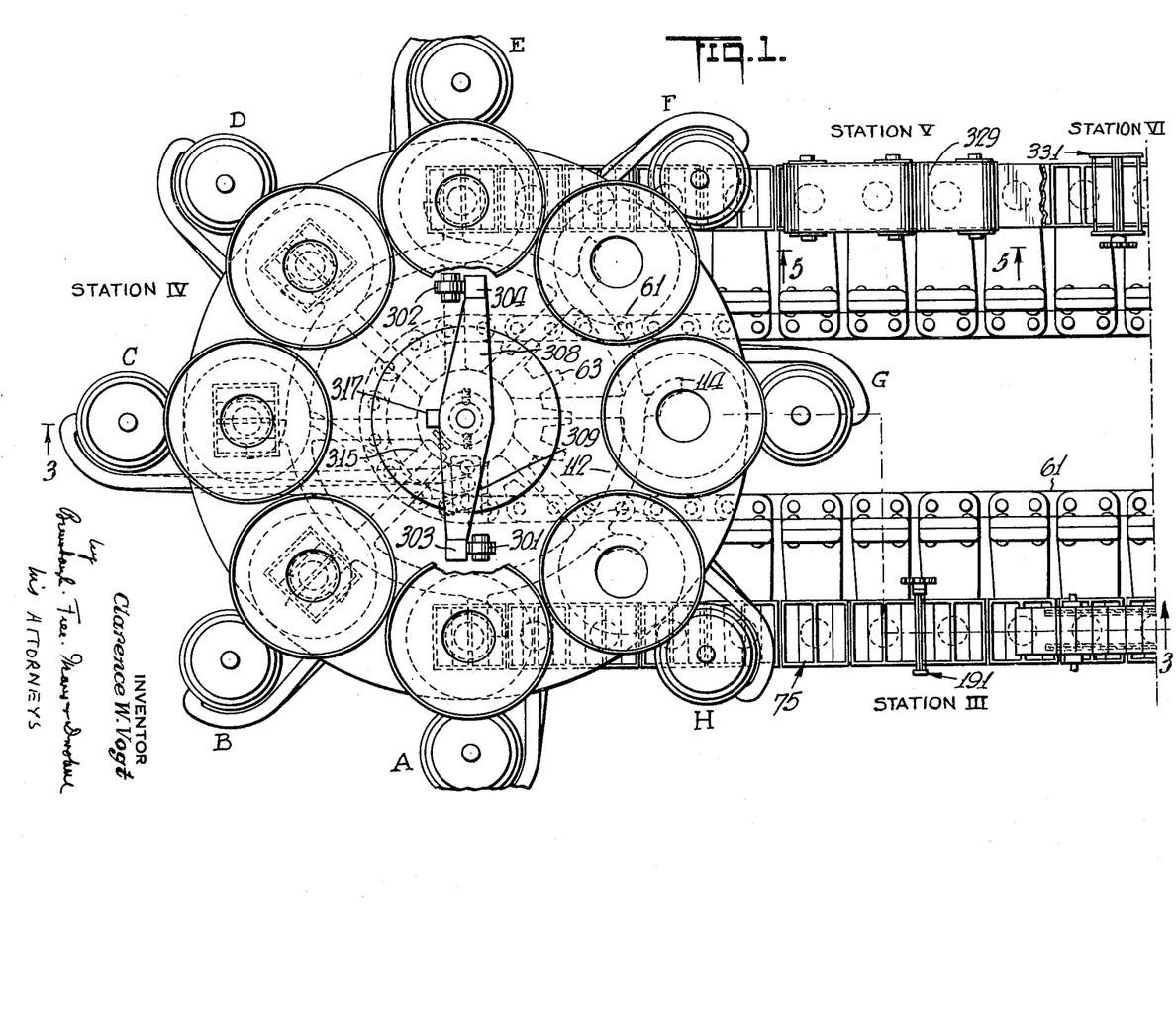
FIGS. 1 and 2 are plan views of the equipment according to one illustrative embodiment of the invention.
Figure 2:
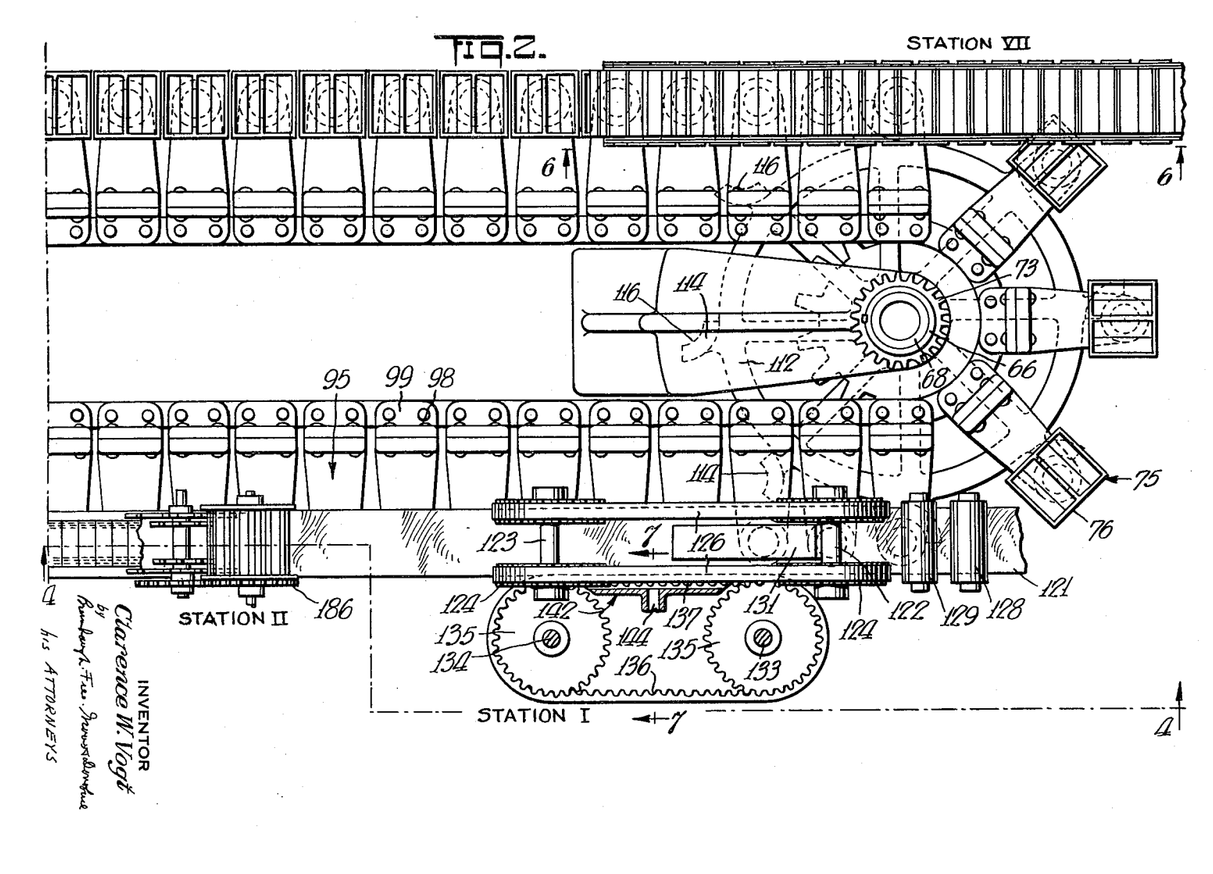
Figure 3:
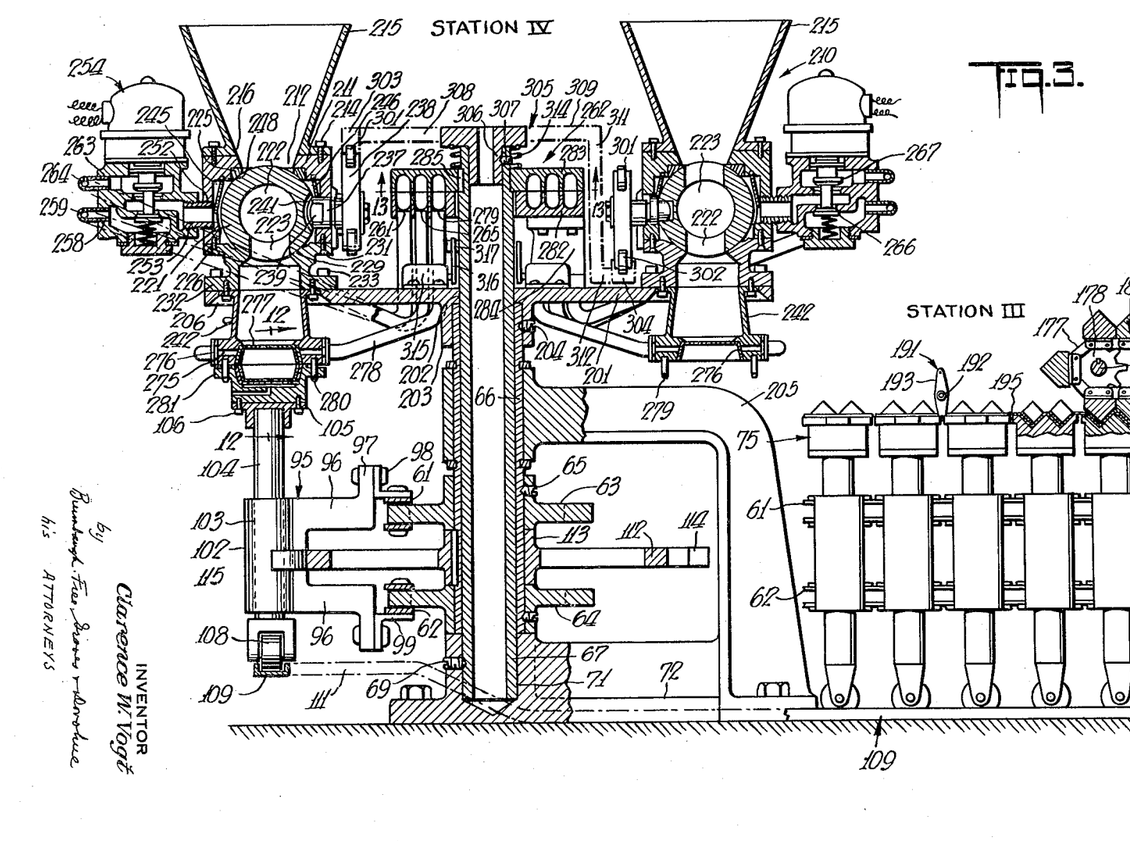
FIG. 3 is a sectional view taken along line 3—3 of FIG. 1.

As shown in FIGS. 1 to 3, the conveyor unit comprises a pair of vertically spaced sprocket chains 61, 62 each riding around a pair of sprocket wheels 63, 64. The sprocket wheels are affixed as by set screws 65 to an associated sleeve 66 through each of which a vertical post 67, 68 extends, each of the posts being securely mounted at its lower end as by a set screw 69 in a socket 71 in a base plate 72.

Keyed to the sleeve 66 encompassing post 68 is a gear 73 driven in any suitable manner to rotate the associated sleeve 66 and hence the sprocket wheels 63 thereon to cause the sprocket chains 61, 62 to turn in a clockwise direction from the position shown in FIGS. 1 and 2.

*Base member molding element (FIGS. 15 to 18)*

Figure 15:
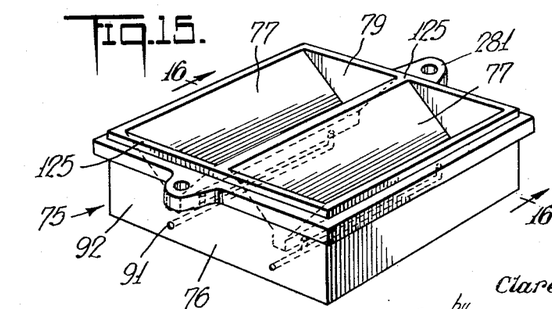
FIG. 15 is a perspective view of the base member molding element.

Carried by the sprocket chains 61, 62 are a multiplicity of identical base member molding elements 75. Each molding element in the illustrative embodiment shown is a substantially rectangular block 76 having a pair of parallel substantially triangular molding cavities or pockets 77 therein, the apex 78 of each of said cavities being adjacent the undersurface of the associated block. Desirably the end and side walls 79 of each of the cavities 77 is tapered slightly to facilitate removal of the package therefrom.

Positioned in the cavities in each of the blocks is a liner member 81 (FIG. 18) of porous material such as sintered bronze. The liner member is illustratively of zig-zag conformation defining a pair of triangular portions 82, each complementary to the triangular cavities 77 and adapted to fit into such cavities.

The apex of each of the triangular portions 82 of the liner 81 has a substantially rectangular rib 83 along its undersurface adapted to fit into a corresponding rectangular recess 84 in the block 76 at the apex of each of the cavities therein. The ends of each of the ribs 83 rests on a seat 85 at each end of the respective cavities to space the undersurface of the rib from the floor of the rectangular recess in the block as is clearly shown in FIG. 17.

Figures 9, 16, 17, 18:
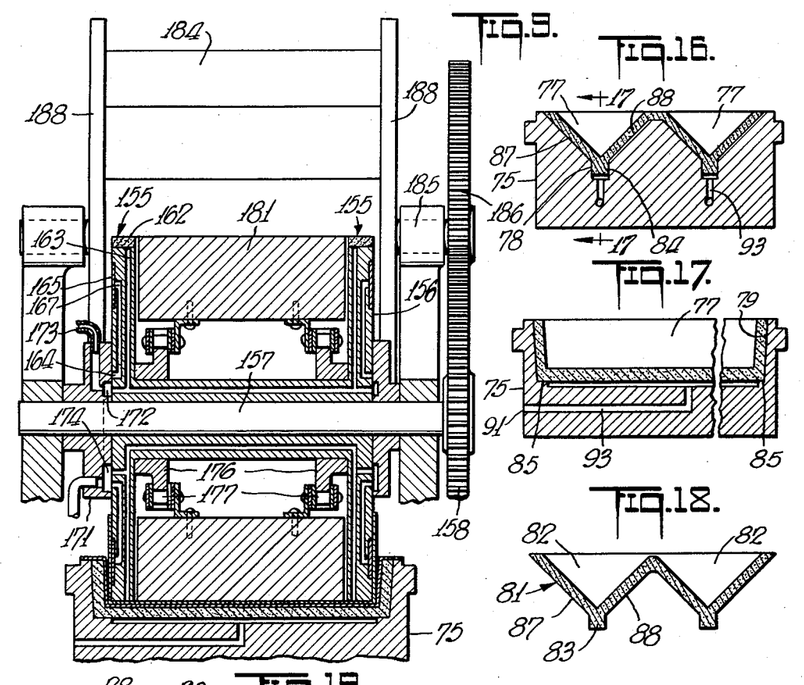
FIG. 9 is a sectional view taken along line 9—9 of FIG. 8.
FIG. 16 is a sectional view taken along line 16—16 of FIG. 15.
FIG. 17 is a view similar to FIG. 16 taken along line 17—17 of FIG. 16.
FIG. 18 is a sectional view of the porous cavity liner.
Figure 12:
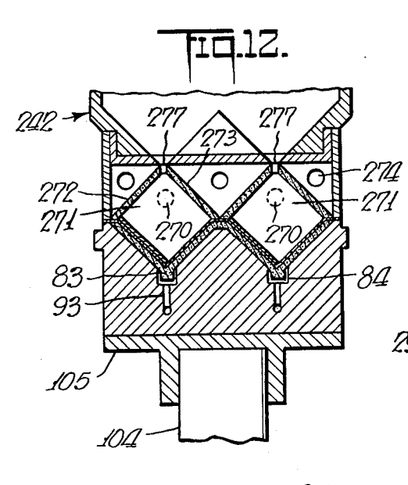
FIG. 12 is a detail sectional view on an enlarged scale taken along line 12—12 of FIG. 3.

The linear 81 is secured in the cavities in block 76 in any suitable manner so that the side walls 87, 88 of each of the triangular portions of the liner will rest against the associated side wall of the cavities as shown in FIG. 16.

Each of the blocks 76 has a port 91 in its side wall 92 leading into each of the cavities 77 through passageways 93 in the blocks so that suction may be applied to such cavities to form the base member of the package in the manner hereinafter described.

*Base member molding element mount (FIG. 3)*

To connect the base member molding elements 75 to the sprocket chains 61, 62 a multiplicity of substantially U-shaped mounts 95 are provided (FIG. 3). The ends of the legs 96 of mounts 95 have flanges 97 which are secured as by rivets 98 to brackets 99 mounted on the top and bottom surfaces of the links forming the sprocket chains 61 and 62 respectively, thus supporting the cross piece 102 of each of the mounts in vertical position as shown in FIG. 3.

The cross piece 102 which illustratively is cylindrical, has a vertical bore 103 which slidably mounts a rod 104, the latter having a mounting plate 105 affixed to the upper end thereof to which a block 76 is secured as by screws 106. The block 76 is so mounted on the plate 105 that the cavities 77 will extend at right angles to the runs of the sprocket chains.

To raise and lower the rod 104 the lower end thereof is provided with a roller 108 which rides in a U-shaped track 109 vertically aligned with the multiplicity of rods 104. The track is provided with elevated portions 111 to raise the rods and associated molding elements 75 where required during the cycle of operation of the equipment.

Means are provided to maintain the base member molding elements 75 equally spaced at angles of substantially 45 degrees to prevent drag as they move around the sprocket wheels 63, 64.

To this end a pair of sprocket wheels 112 are provided keyed respectively to each of the sleeves 66 on posts 67, 68 to rotate with such sleeves, the hub 113 of sprocket wheels 112 defining spacers for the sprocket wheels 63, 64.

Each of the sprocket wheels 112 has a plurality of teeth 114 spaced at intervals of 45 degrees around the circumference thereof. The diameter of the sprocket wheels 112 is such that the leading edge 116 (FIG. 2) of each tooth, which has an arcuate configuration, will engage the cylindrical cross piece 102 of mounts 95 to guide the rods 104 so that they will be spaced by an angle of 45 degrees as they move around the sprocket wheels 63, 64.

*Base member strip insertion station I (FIGS. 2, 4, 7)*

Means are provided to apply a strip of thin sheet plastic material 121 over the cavities 77 in the molding elements 75 so that they may be drawn into such cavities to form the base member 21 of the container.

To this end as illustratively shown in FIG. 2, a pair of spaced horizontal shafts 122, 123 is mounted over the line of molding elements 75 adjacent post 68. Each of the shafts mounts a pair of pulleys 124 which are vertically aligned with the top end portions 125 of each molding element 75 extending laterally beyond the ends of the cavities therein. The pulleys are encompassed by endless belts 126, the lower runs 127 of which are adapted to press against the top end portions 125 of the molding elements. The pulleys may be driven in any suitable manner so that the lower runs of belts 126 will advance at the same rate of speed as the advance of the molding elements by the sprocket chains 61, 62.

The strip 121 of plastic material may be drawn from a supply reel (not shown) by means of driven rollers 128 and fed beneath a guide roller 129 to enter the nip 130 defined by the belts 126 and the end portions 125 of the molding elements 75. Thus, as the lower run 129 of the belts and the molding elements are advanced, the strip 121 will be continuously drawn from its supply reel.

Associated with the belts 126 and positioned therebetween adjacent shaft 122 is a heating member 131 which is in close juxtaposition to the strip 121 of plastic material as it is advanced so that such strip will be softened for ready deformation when suction is applied to ports 91 of the molding elements 75.

Figure 4:
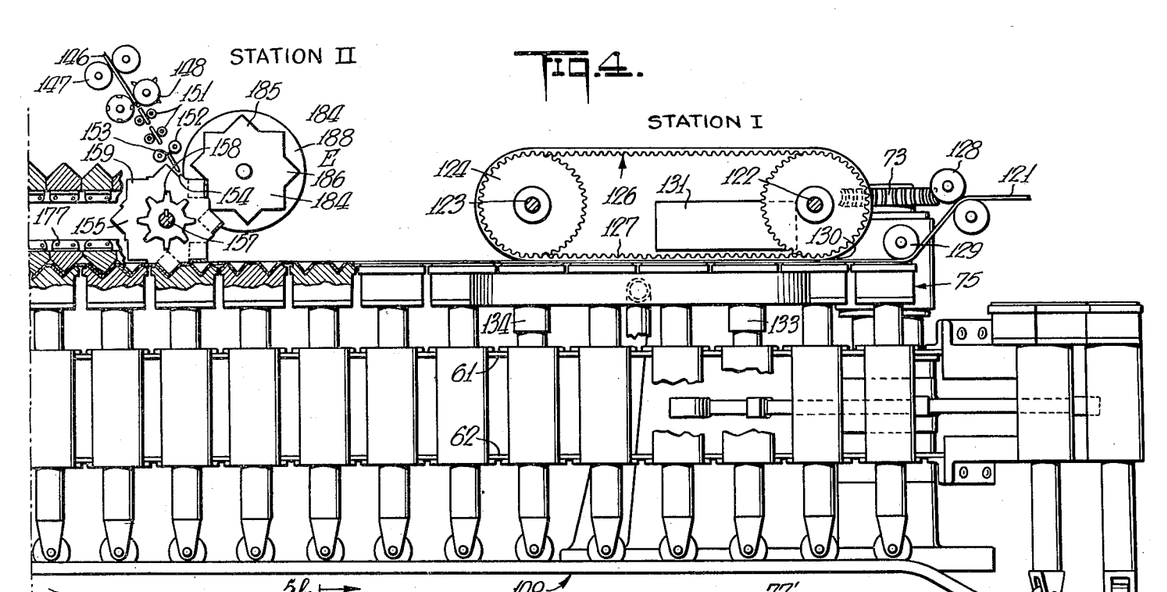
FIG. 4 is a side elevational view of the base member forming station and reinforcement forming station.
Figures 7, 8, 10, 11:
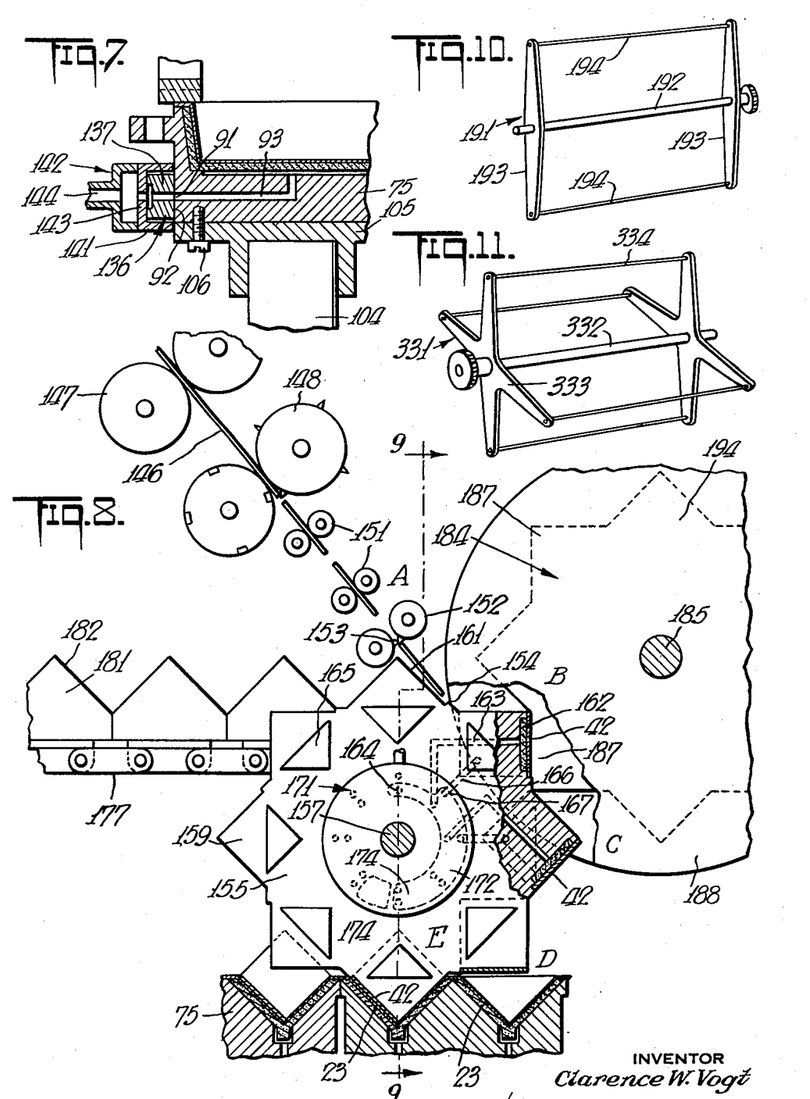
FIG. 7 is a sectional view taken along line 7—7 of FIG. 2.
FIG. 8 is a side elevational view on an enlarged scale of the reinforcement forming and insertion station.
FIGS. 10 and 11 are perspective views of the cutting mechanism.

Although suction may be applied to ports 91 in any suitable manner as illustratively shown in FIGS. 2, 4 and 7, a pair of spaced vertical shafts 133, 134 are mounted adjacent the belts 126, each carrying a pulley 135 which mount an endless perforated belt 136. The pulleys 135 which may be driven in any suitable manner, are positioned so that the inner run 137 of the belt 136 will press against the vertical side walls 92 of the molding elements 75 as they are advanced.

Positioned between the pulleys 135 and straddling the run 137 of belt 136 are the legs 141 of a U-shaped channel member 142, the latter having a perforated wall 143 against which the belt run 137 rides and a port 144 which may be connected to a source of suction.

Thus, when suction is applied to port 144 it will through port 91 and passageways 93 and porous liner 81 create suction in the cavities 77 of the molding elements 75 to draw the softened plastic strip 121 into the cavities as more fully described herein to form the base member 21.

*Reinforcement member insertion station II (FIGS. 2, 3, 4, 8, 9)*

Means are provided to insert a reinforcement member 41 of the type shown in FIG. 21 into each of the plastic sheet lined cavities in the blocks 76.

The equipment forms such reinforcement members from a continuous strip 146 of suitable material such as cardboard of width equal to the combined length of the cross piece 42 and legs 43 thereof. The strip 146 which is mounted on a suitable supply reel (not shown) is fed between scoring rollers 147 which form scores between cross piece 42 and legs 43 to facilitate folding of such legs and also for the diagonal scores 44.

Thereupon the strip 146 passes between cutting rollers 148 which sever the strip to form the individual reinforcement member. The severed strips are propelled by rollers 151 between rollers 152 which have suitable fingers 153 that engage the rear edge of each severed reinforcement member so that they will be properly positioned when propelled by rollers 152 against shoulders 154 of a pair of star wheels or discs 155, the outer faces 156 of which are spaced by a distance substantially equal to the length of the cross piece 42 of the reinforcement member 41.

As shown in FIG. 9, the discs 155 are secured to a shaft 157, having a sprocket wheel 158 thereon driven in any suitable manner in timed relation with the advance of the molding elements 75 to rotate the discs in a clockwise direction. Each of the discs 155 has a plurality of substantially triangular teeth 159 illustratively eight in number complementary to the lined triangular cavities 77 in the molding elements 75.

The leading edge 161 of each tooth 159 desirably has a plate 162 of porous material such as sintered bronze affixed thereto and a passageway 163 leads from such leading edge 161 to a port 164 in the side wall 156 of a disc 155, the shoulder 154 previously described being at the root end of each of such leading edges 161. In addition, an additional plate 165 of porous material is also associated with each tooth and positioned on the side wall 156 of each disc, said plates 165 being substantially triangular as shown and having their bases positioned along the base of each tooth. Each disc is provided with an additional passage 166, extending from the plate 165 to a port 167 also in the side wall 156 of the disc 155, said ports 164, 167 being arranged in concentric rows.

Associated with one of the discs 155 is a fixed manifold 171 which is retained in airtight relation with the disc 155. The manifold 171 has an arcuate groove 172 therein with a suction port 173 connected thereto, the ports 164 being in communication with groove 172 when the teeth 153 are in positions A, B, C and D and the ports 164, 167 being in communication with groove 172 when the teeth 153 are at positions B, C, D. In addition, the disc 155 has a pressure port 174 with which the ports 164, 167 are in communication when the teeth are at position E.

Straddled by discs 155 and mounted on shaft 157 is a pair of sprocket wheels 176 which carries one end of endless sprocket chains 177, the other ends of said chains being mounted on sprocket wheels 178 carried by a shaft 179.

Each of the parallel links of the sprocket chains 177 carries a pressure member 181 extending transversely between the discs 155 and having a triangular conformation 182 on their outer surfaces complementary to the cavities 77 in the molding elements 75. The triangular conformation 182 also conforms to the triangular teeth 153 so that they may be aligned therewith.

Associated with the discs 155 is a drum 184 mounted on a shaft 185 having a sprocket wheel 186 thereon driven in any suitable manner, said drum having a toothed periphery 187 complementary to the teeth 153 of the discs 155 so that when the drum teeth 187 engage the disc teeth 159 at position B, the cross piece 42 of reinforcement member 41 will be securely clamped in position against the leading edges 161 of teeth 159. The drum 184 is of length substantially equal to the distance between the outer faces 156 of discs 155 and a circular plate 188 is mounted on each end of the drum 184, the diameter of said plate 188 being greater than that of said drum so as to overlap the latter to bend the ends of the reinforcement members against the suction plates 165 on discs 155 to form the legs 43.

*Cutting station III (FIGS. 3, 10)*

Means are provided to sever the span of sheet material 102 between adjacent molding elements 75.

To this end as shown in FIGS. 3 and 10, a cutting member 191 is provided comprising a shaft 192 extending transversely across the line of molding elements 75. Affixed to the ends of the shaft is the mid-portion of arms 193 between the ends of which extends a length of resistance wire 194 which may be heated in any suitable manner.

Thus, when the shaft 192 is rotated in a clockwise direction from the position shown in FIG. 3 in timed relation with the movement of the molding elements, the two lengths of resistance wire 194 will succesively engage the portions 195 of the strip 121 between adjacent molding elements 75 to sever such strip.

*Filling station (FIGS. 1, 3, 12)*

The filling station shown in FIGS. 1 and 3 desirably comprises a circular plate 201 having an axial opening 202 through which post 67 extends and having an axial hub 203 affixed as by set screw 204 to the upper end of the sleeve 66 mounted on said post 67.

The plate 201 which is mounted above a supporting bracket 205 for the post 67 has a plurality of circular openings 206 therethrough, illustratively eight in number, equally spaced around its periphery.

Affixed to plate 201 over each of the openings 206 is a filling head 210 desirably of the type shown in copending application Serial No. 594,152, filed June 27, 1956. As such filling head is clearly shown and described in said patent application it will only be described herein to the extent necessary for a clear understanding of the invention.

As shown in FIG. 3 the filling head comprises a box-like housing 211, having a substantially frusto-conical inlet port 212 through its top wall leading into the interior of the housing. Positioned on the top wall of the housing 211 and secured thereto as by screws 214 is a hopper 215, also preferably frusto-conical and having its lower end 216 aligned with the mouth of inlet port 212.

Rotatably mounted in the housing 211 is a valve member 221, illustratively a ball having a passageway 222 extending diametrically therethrough and a radial passageway 223 of diameter substantially equal to that of passageway 222, which intersects the latter at substantially right angles to form a generally T-shaped passage in the valve member 221.

To mount the ball 221, the inner wall of housing 211, adjacent inlet port 212, has an annular seat on which a resilient sealing ring 225 is positioned. A cylindrical retaining member 226 adjacent the lower edge of housing 211 has a bore therethrough with a curvature substantially corresponding to that of the ball 221 and the lower end of said bore has an inwardly extending annular seat 229 opposed to sealing ring 225. The retaining member 226 which may be affixed to housing 211 as by screws 231 has a flange 232 through which screws 233 extend to mount the filling head 210 on the plate 201.

Although the ball 221 may be rotated in any suitable manner, in the illustrative embodiment shown, a shaft 237 is provided extending transversely of the housing 211 and rotatably mounted in the side wall thereof in leak-proof relation thereto. The shaft 237, which may be rotated by a lever 238 has flats 239 formed on opposite sides of its inner end to render it non-circular in cross section and said flattened inner end is positioned in a slot 241 in a side of the ball 221 to enable the shaft 237 to rotate said ball 221 so that the passageway 222 may be disposed vertically as shown on the right side of FIG. 3 to provide communication between the hopper 215 and a magazine 242 depending from flange 232 below plate 201 or horizontally as shown on the left side of FIG. 3 to close the inlet port 212. When the passageway 222 is in horizontal position, the passageway 223 will be disposed vertically in communication with the magazine.

As shown in FIG. 3, a clearance space 245 is provided between the ball 221 and the inside of the housing 211. Positioned in the upper portion of the space 245 and encompassing the ball 221 is a ring 246 of sintered or porous metal preferably frusto-conical as shown. The upper edge of ring 246, which is of smaller diameter, is retained against a resilient O ring 248 positioned in an annular groove adjacent to and encompassing sealing ring 225.

The porous ring 246 forms the inner wall of an annular chamber in communication with a port 252 leading into the housing 211. The surface area of the ring 246 is several times the diameter of the passageway 223, so that when air under pressure is forced through ring 246 in the manner hereinafter described, there will be a rapid build up of pressure on the material in the magazine for ejection of such material.

Connected to port 252 is the control port 253 of a solenoid controlled valve 254 of conventional type such as that put out by the Ross Operating Valve Co. of Detroit, Michigan. The valve 254 has an inlet port 258 which may be connected by a line 259 to an associated pressure port 261 of a manifold unit 262 and an exhaust port 263 which may be connected by line 264 to an associated suction port 265 of manifold unit 262.

Communication between ports 258, 253 and 263, 259 is effected through valves 266, 267 respectively, the former normally being closed and the latter open when the solenoid controlling the valve 254 is de-energized.

The magazine 242 of the filling head 210 at its lower end (FIG. 12) has a plurality of substantially triangular cavities 271 therein each with porous side walls 272, 273 and with vents 274 associated with such walls and in addition, the end walls of the cavities 271 have ports 270 connected by passageways 275 to ports 276. The cavities 271 in the magazine are desirably complementary to those in block 76 so that when the block is moved upwardly in sealing engagement with the lower end of the magazine, a substantially rectangular cavity will be formed which can be filled by expulsion of material through the passageways 277 in the magazine in the manner described in the aforementioned patent application.

As shown in FIG. 3, the port 276 is connected by line 278 to the associated port 279 of manifold unit 262.

Desirably the lower end of the magazine 242 has a plurality of tapered pins 280 which may enter corresponding openings in ears 281 formed integral with the blocks 76 to align the blocks and the magazines.

Figure 13:
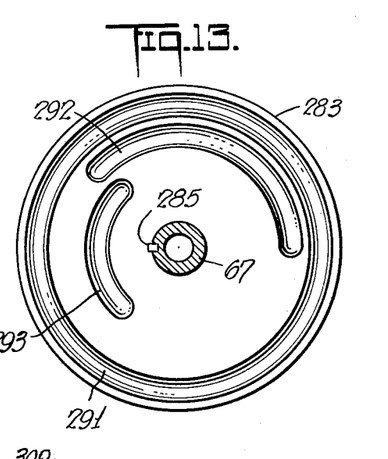
FIG. 13 is a sectional view of the manifold taken along line 13—13 of FIG. 3.

As shown in FIGS. 3 and 13, the manifold unit 262 comprises a pair of discs 282, 283 each with an axial opening through which the post 67 extends. The disc 282 is secured to the plate 201 as by a bracket 284 so that the disc 282 will rotate therewith. The disc 283 is keyed to the post 67 as at 285 so that it will be vertically movable with respect thereto but restrained from rotation.

The disc 283 has an outer annular groove 291 and two arcuate grooves 292, 293 aligned respectively with the concentric rows of ports 261, 265 and 279 in disc 282. The grooves 291, 292 and 293 are connected by suitable lines to a source of pressure and to two sources of suction respectively, the suction applied to groove 292 being greater than that applied to groove 293.

As clearly shown in FIGS. 3 and 13, the groove 291 and ports 261 are in communication at all times. The groove 292 and ports 265 are in communication as the filling heads advance from position D (FIG. 1) past position G and the groove 293 and ports 279 are in communication as the filling heads advance from position B to position D for the purpose hereinafter described.

Figure 14:
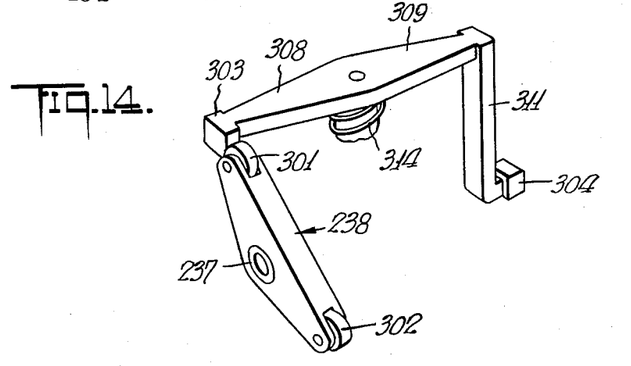
FIG. 14 is a diagrammatic perspective view illustrating the operation of the ball valve actuating mechanism.

Although the ball valve 221 may be rotated in any suitable manner, as shown in FIGS. 3 and 14, the arm 238 has a roller 301, 302 at each end adapted to abut against diametrically aligned fixed stops 303, 304 respectively. The stops 303, 304 are mounted on a bracket 305 having a hub 306 affixed as by set screw 307 to post 67. Extending radially from hub 306 are diametrically aligned arms 308, 309, the arm 308 mounting the stop 303 at its outer end and the arm 309 having a downwardly extending arm 311 with a laterally extending finger 312 which mounts the stop 304.

The stops are positioned in the path of movement of the rollers 301, 302 so that when the plate 201 is rotated, the roller 301 will engage stop 303 between position H and A (FIG. 1). With continued rotation of the plate the arm 238 will be rotated to turn ball valve 222 through an angle of 90 degrees so that port 223 is vertically aligned with the magazine. Such movement is completed while the filling head advances to position B and thereupon the roller 301 will ride beneath the stop 303 to clear the latter.

When the roller 302 reaches position E, it will engage the lower stop 304 so that with further advance of the filling heads the arm 238 will be rotated to turn ball valve 222 through an angle of 90 degrees so that passageway 222 is vertically aligned with the hopper 215 and the magazine 242.

The stops and associated supporting structure are shown in broken lines in FIG. 3 in order to show their relative position with respect to the other components of the equipment. It is of course understood that the elements shown in broken lines are displaced 90 degrees from the position shown, i.e., they are actually in the position shown in FIG. 1.

As shown in FIG. 3, a coil spring 314 encompasses the upper end of the post 67 and is compressed between arms 308, 309 and disc 283 of the manifold unit 262 to retain such disc in sealing engagement against disc 282.

Means are provided to energize the valve 254 in timed relation with the rotation of plate 201 so that valve 267 closes and valve 266 opens to connect the source of gas under pressure from port 261 of the manifold unit through line 259 into port 252 of the casing 211.

To this end, a plurality of micro-switches 315 are mounted on plate 201 associated respectively with each of the filling heads 210. Each of the micro-switches has an upstanding actuating arm 316 which engage a cam 317 fixed to post 67 when the associated filling head is at station C and such micro-switch which is electrically connected to valve unit 254 will retain the latter energized for a sufficient interval for complete filling of the base member.

*Cover member forming station V (FIGS. 1, 5)*

The cover member forming station desirably comprises a drum 321 (FIG. 5) rotatable on a horizontal shaft 322 positioned over the line of molding elements 75. The drum has a plurality of molding elements therein, each having a triangular molding cavity 77' therein, substantially identical in shape to the cavities 77 in the molding elements 75. One of the end walls of the drum 321 has elongated recesses 320 in its periphery aligned respectively with the end of the cavities 77', each of said recesses being centrally located with respect to the associated cavity and of length approximately one third of the maximum width of said cavity. Each of said cavities has a porous liner 81' therein substantially identical to each of the triangular portions 82 of the liners 81 shown in FIG. 18. Thus, each of the cavities 77' in drum 321 has a rectangular recess 84' at its apex into which the substantially rectangular rib 83' of the liner 81' is positioned, the ends of said rib resting on seats at each end of recess 83' to space the undersurface of the rib from the floor of the recess 77'.

Figure 5:
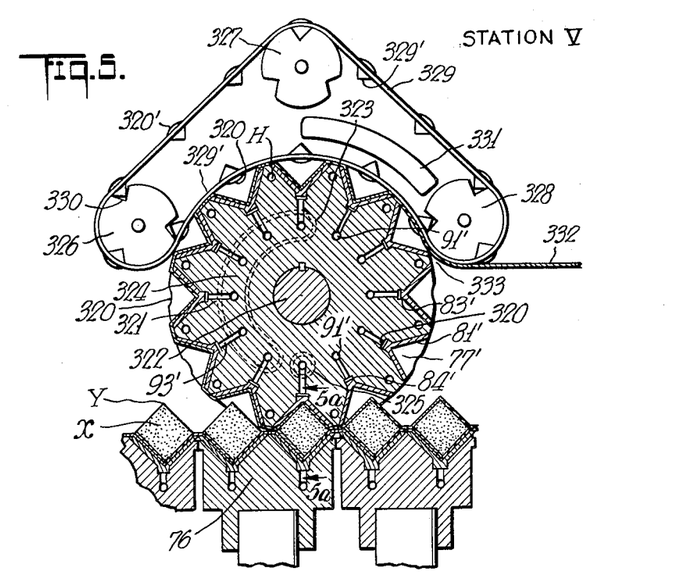
FIG. 5 is a side elevational view of the cover member forming station.
Figure 5A:
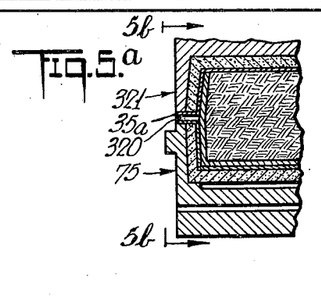
FIG. 5a is a fragmentary sectional view taken along line 5a—5a of FIG. 5.
Figure 5B:
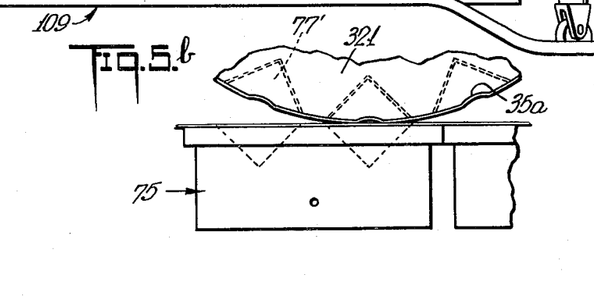

Each recess 77' has a port 320 connected by suitable passageways 93' to ports 91' in the end wall of the drum arranged in a circle about shaft 322. A manifold 323 mounted in fixed position with respect to the rotatable drum 321 and in airtight relation therewith has an arcuate cavity 324 with which a plurality of the ports 91' are aligned as shown in FIG. 5. The manifold also has a circular cavity 325 with which the ports are successively aligned when they are at their lowermost position.

The manifold has suitable ports (not shown) connected to arcuate cavity 324 and circular cavity 325 to which a source of vacuum and a source of pressure may be connected respectively.

Positioned respectively on each side of the drum 321 and also directly above the latter are rollers 326, 327, 328 which mount a belt 329 which is retained against the periphery of the drum 321 and a heating element 331 is mounted adjacent roller 328.

The belt 329 along the edge thereof aligned with the recesses 320 in drum 321 has a plurality of spaced elongated protuberances 320' on its outer surface complementary to said recesses 320 so that they may nest in said recesses. Desirably, the inner surface of belt 329 has spaced teeth 329' adapted to mesh with corresponding depressions 330' in rollers 326, 327 and 328 to effect accurate registry of the protuberances 320' with the associated recesses 320.

If desired, recesses 320 could be provided at both ends of the drum 321 and both edges of belt 329 could have the protuberances 320'.

Thus, when the end of a continuous strip 332 of plastic material is inserted into the nip 333 between the portion of belt 329 engaging roller 328 and the periphery of drum 321, such strip will be drawn from a supply reel (not shown) to overlie the cavities 77' beneath the lower run 329' of belt 329 so that when suction is applied to the arcuate cavities 77' through manifold 323 the heated strip will be drawn into the cavities to form the cover member 72 (FIG. 19).

Cutting station VI (FIGS. 1, 11)

Means are provided to sever the span of sheet material 322 between adjacent molding elements 75 and also the spans of sheet material 121, 322 between adjacent cavities in the molding element to complete the package.

To this end as shown in FIG. 11, a cutting member 331 is provided similar to cutting member 191 at station III. Cutting member 331 has a shaft 332 extending across the line of molding elements 75. Affixed to each end of the shaft 332 is the mid-portion of a pair of crossed arms 33 between the ends of which extend lengths of resistance wire 334 which may be heated in any suitable manner.

Thus, when the shaft 332 is rotated in a counter-clockwise direction from the position shown in FIG. 1 in timed relation with the movement of the molding elements, the four lengths of resistance wire 334 will successively engage the spans of sheet material to sever the latter between adjacent cavities.

Figure 6:
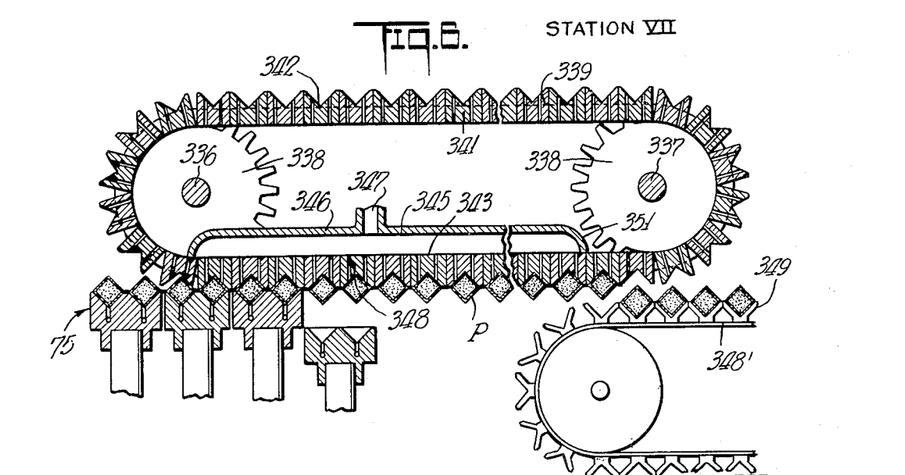
FIG. 6 is a view similar to FIG. 5 of the package removal station.

Package removing station VII (FIGS. 2, 6)

Means are provided to remove the completed packages from the molding elements 75'. To this end a pair of spaced horizontal shafts 336, 337 are provided, the shaft 336 being located to the left of vertical post 68 and the shaft 337 to the right of said post. Each of the shafts mounts a pair of sprocket wheels 338 which straddle the line of molding elements 75. The sprocket wheels carry endless sprocket chains 339, each of the parallel links of which carries an elongated block 341 which extends transversely across the line of molding elements. Each of the blocks has a triangular recess 342 therein complementary to the triangular recess in drum 321 and the blocks are so positioned that when the shafts 336, 337 are driven in timed relation with the advance of the molding elements, the successive cavities in the lower run 343 of blocks 341 will nest over the triangular portions of the completed packages extending above the molding elements.

Means are provided to effect suction through the lower run 343 of the blocks 341 when they are in juxtaposition to the molding elements 75 to retain the packages in the cavities 342 in the block.

To this end, a suction unit 345 is provided which may comprise a channel member 346, the side and end walls of which are against the inner surface of the lower run of blocks 341. Thus when suction is applied through port 347 of the channel member 346 and through passageway 348 through the blocks 341, the packages will be retained by such suction in the cavities 342 in the blocks.

Positioned beneath the shaft 337 clear of the molding elements 75 is a conveyor belt 348' movable in the same direction as the lower run 343 of the blocks 341. The conveyor belt 348' has a plurality of triangular troughs 349 thereon adapted to be aligned with the recesses in blocks 341 so that when the packages carried by the blocks 341 are moved past the end 351 of the channel member 346 to break the suction, the packages will drop into the troughs 349 so that they will be removed from the equipment.

Operation

In the operation of the equipment, a strip 121 (FIG. 4) of plastic material is positioned at the base member forming station I between rollers 128 and beneath roller 129 with the end of the strip at the nip 130 between the belts 126 and the molding elements 75. By means of a suitable drive (not shown) the gear 73 is rotated to turn sleeve 66 on post 68 and hence rotate the associated sprocket wheels 63, 64 to drive the sprocket chains 61, 62 and the sprocket wheels 63, 64 on post 67 (FIG. 3) to rotate the associated sleeve 66.

As the belts 126 clamp the strip 121 against the top surfaces of the molding elements 75 and as such belts are rotated in the same direction as the movement of the molding elements by the sprocket chains, the strip 121 will be securely clamped against such molding elements. As the strip moves past the heater 131 the plastic strip 121 will be softened so that when suction is applied through port 144 of the channel member 142 (FIGS. 2 and 7) such suction will also be applied through the perforated belt 136 retained against the side walls 92 of the molding elements 75. Consequently, as the belts 136 are rotating, also in timed relation to the movement of the sprocket chains and the molding elements thereon, suction will be applied through the ports 91 of the molding elements 75, passageways 93, thence through the porous liner 81 to draw the strip 121 inwardly into the cavity 77 in the molding elements to rest against the walls of the porous liner to conform to the configuration thereof to define a plurality of transversely extending semi-formed base members 21 (FIG. 19).

The semi-formed base members 21 will be advanced by the movement of the conveyor to the reinforcement forming and insertion station II. At this station a continuous strip 146 of suitable cardboard material, for example, will be forced between the scoring rollers 147 which will form the score lines in the cardboard strip to define the legs 43 of the reinforcement member 41 as well as the score lines 44. The scored strip is then fed between the cutting rollers 148 which when rotated will sever the strip to form the proper width of the reinforcement member. The severed portions of the strip, which are forced between the driven rollers 151 will be rapidly ejected by such rollers between the positioning rollers 152 and the arms 153 of such rollers will thereupon successively propel the severed portions of strip 146 against the shoulder 154 of the rotating discs 155 (FIGS. 4 and 8).

By reason of the suction applied through passageways 163 to the ports in the leading edges 161 of the teeth 159 of the rotating discs 155 associated with the porous plates 162 on said leading edges, the severed portions of strip 146 will be securely retained against such leading edges. Thereupon, as the discs 155 are rotated, the ends of the severed portions past the score lines defining the legs 43 thereof, will be moved downwardly by the circular plates 188 on drum 184 and such legs 43 as they are moved against the porous plate 165 of each tooth 159 will be retained against such plates by means of suction applied through ports 167. As the toothed periphery 187 of drum 184 meshes with the teeth 159 on discs 155, the end portions of the cross piece 42 of the reinforcement member will be retained in locked position while the legs 43 are folded downwardly, to prevent slippage.

The rotation of the discs 155 is timed with the movement of the molding elements 75 by the sprocket chains. Hence, as the molding elements in which the semi-formed base members have been positioned, advance past the discs 155 at station II, the teeth of the disc 155 will enter the cavities 77 in the molding elements 75 to place the cross piece of the reinforcement member against the side wall 23 of the base member as is clearly shown in FIG. 8 and the lower portions 45 of the legs 43 of the reinforcement member will rest against the end walls 29 of the base member 21. As the base member 21 is still in heated condition by reason of the heating element 131, the portions of the reinforcement member thereagainst will bond thereto as such reinforcing members desirably have a microcrystalline coating of wax on their undersurface. With continued advance of the molding elements 75 and rotation of the discs 155, the pressure members 181 at station II will also advance to retain the reinforcement member 41 against the side and end walls of the semi-formed base member 21 to insure that sufficient time will elapse so that the base member 21 will cool to permit firm bonding of the reinforcement member 41 thereto.

Thereupon, the semi-formed base member 21 with the reinforcement member 41 inserted therein is advanced from station II to the cutting station III (FIGS. 3 and 10).

As the shaft 192 carrying the partial arms 193 is rotating in timed relation with the advance of the conveyor, the heated resistance wires 194 at each end of the arms will engage the span 195 of strip material 121 between successive molding elements 75 to sever such strip material thereby freeing the molding elements from each other so that they may move in an arc thereupon in the manner hereinafter to be described, and forming lateral fins 34.

After the strip 121 has been severed, as thus described, the molding elements 75 with the semi-formed base members 21 and with reinforcement members 41 therein will be advanced by the conveyor to the filling station IV.

Referring to FIGS. 1 and 3 of the drawings, as the sleeve 66, shown in FIG. 3, is rotated by the sprocket wheels 63, 64, the sprocket wheel 112 also mounted on sleeve 66 will similarly be rotated in a clockwise direction. The toothed end 114 of the sprocket wheel 112 will engage the cylindrical cross piece 102 of the mount 95 when the latter is at position A shown in FIG. 1 and thereupon as the mounts 95 move in an arc around sprocket wheels 63, 64 (FIGS. 1 and 3) the toothed ends 114 of sprocket wheel 112 will retain the mounts 95 spaced by an angle of 45 degrees to insure alignment.

As the molding elements advanced from the cutting station III shown in FIGS. 1 and 3 to the filling station IV, the rollers 108 at the lower end of rods 104 will ride up the inclined portion 111 of the track 109.

As the roller 108 rides up the track it will raise the rod 104 and hence lift the molding element 75 carried at the upper end thereof. At the same time as the molding element is being raised as above described, the filling unit at position H(FIG. 1) will be moved by the rotating plate 201 from position H to position A and when such filling unit reaches position A, the molding element 75 will have at such time been moved upwardly so that it is pressed against the lower end of the magazine 242 of such filling unit as is clearly shown in FIG. 3. Inasmuch as the teeth 114 of the sprocket wheel 112 are engaging the cross piece 102 of the mount 95, it is apparent that such mount will be accurately located and as the disc 201 and the molding elements 75 are moving in timed relation, the molding element 75 will be accurately located with respect to the lower end of the magazine and the pins 280 carried by the magazine will enter the openings in ears 281 to insure that the molding element and the lower end of the magazine are in registry and retained in substantially airtight relation.

The portion of track 109 engaged by the roller 108 when the molding element is in clamped position is desirably separate from the remaining portion of the track and is resiliently urged upwardly by suitable means (not shown) so that dependable clamping will be effected between the molding elements 75 and the magazine 242.

As the plate 201 rotated and the filling unit advanced from position H toward position A, the roller 301 carried by arm 238 engaged the fixed upper stop member 303. As the result, with continued movement of the filling unit on the disc 201, the arm 238 will be rotated to turn the ball valve 221 through an angle of 90 degrees from the position shown on the right side of FIG. 3 in which the diametric passageway 222 provided communication between the hopper 215 and the magazine 242 to a position shown on the left side of FIG. 3 in which the passageway 223 was in alignment with the magazine and the hopper was closed by the ball.

With continued rotation of the plate 201 to move the filling unit from position A (FIG. 1) toward position B, the roller 301 will move beneath the stop 303 to clear the latter.

As the plate 201 rotates to move the filling unit from position A and immediately after the molding element 75 is completely clamped to the magazine 242 as shown in the left side of FIG. 3, the rotatable disc 282 of the manifold 262 will have rotated sufficiently so that the port 279 thereof connected to port 276 of the magazine 242 to which the molding element 75 has just been clamped, will have moved into alignment with arcuate groove 293 in the fixed disc 283. As a result, suction will be applied to port 276 of the magazine 242, which through passageway 275 will cause the upstanding legs 43 of the reinforcement member 41 to be retained against the beveled end walls of the magazine so that they will be in desired position for filling and no material will seep between the legs 43 and the end walls of the magazine.

As the filling unit is advanced from position B (FIG. 1) toward position C, immediately prior to reaching position C, the upstanding arm 316 of the microswitch 315 associated with the filling unit will engage the cam 317 affixed to the post 67 to actuate the switch 315 thereby energizing the solenoid operated valve unit 254 to close valve 267 and open valve 266 thereof. Consequently, a source of gas under pressure will be applied from annular groove 291 in disc 283 of the manifold through the associated port 261, line 259, to port 258 of the valve unit 254 and thence through open valve 266 and port 253 into port 252 of the casing 211. The gas is preferably dried before application so that any gas that will enter the container being charged, will have the minimum of water vapor. The compressed gas will pass through the porous ring 246 in casing 211 and exert pressure against the ends of passageway 222 against the upper portion of the mass of material in the passageways 222, 223 and in the magazine 242. As the surface area of the porous ring is several times that of the diameter of the passageway 223, it is apparent that there will be a rapid buildup of pressure on the material in the magazine which is previously charged in the manner to be described, such pressure build-up being necessary to obtain uniform compactness.

As the gas is diffused by passing through porous ring 246, channeling of the gas through the comminuted material and turbulence above the material are largely eliminated.

By reason of such gas pressure on the material, it will be forced at relatively high speed through passageway 277 in the lower end of the magazine in the manner described in co-pending patent application Serial No. 594,152, to fill the rectangular cavities defined by the reinforced base members 21 and the cavities 271 in the magazine 242. By reason of such gas pressure the reinforced troughs in the base members 21 will be filled with material in compacted form and such material will also protrude above the mouth of the base member as at X (FIG. 5) also in compacted form, being retained by the walls of the cavities 271 in the magazine 242 and the upper portion 46 of the legs 43 of the reinforcement member 41 in prismatic shape. Consequently, with continued rotation of plate 201, the arm 316 of switch 315 will move away from cam 317 to de-energize valve unit 254. Hence, valve 266 will close to shut off the application of gas under pressure and valve 267 will open to connect suction to the interior of the casing 211 from port 265 of disc 282 of the manifold, line 264 to port 263 of the valve unit 254. Although there is a tendency for the material in the magazine and the passageways 222 and 223 to be forced toward port 263 upon release of the pressure and application of suction, by reason of the porous ring 246, none of the material will pass therethrough into the suction system.

As the plate 201 rotates to advance the filling unit from position D toward position E, as the track has a depression at such portion, the roller 108 will ride down the track to move the molding element 75 away from the lower end of the magazine. Prior to such downward movement of the molding element 75, the suction applied to port 276 of the magazine will be cut off by reason of the fact that the arcuate groove 293 in communication with ports 279 terminates prior to the region at which the track slopes downwardly to effect the separation between the molding element 75 and the magazine. Such cut-off of suction is required at this position inasmuch as that if it were maintained, the legs 43 of the reinforcement member 41 would be retained against the end walls of the magazine 242 so that when the magazine and molding element were separated the filled base member 21 would tend to be pulled out of the molding element 75.

As the portion 46 of the legs 43 of the reinforcement member 41 will bend at the score lines 44 to rest against the tapered end walls of the cavities 271 in the magazine, withdrawal of the molding element from the magazine will occur without disturbing the compacted material. In addition, as the upper edge of the compacted material at the ends of each cavity in the base member is adjacent the apex Y of the legs 43, the latter will also prevent disturbance of such upper edge.

As the rotating plate 201 moves the filling unit from position D toward position E, the roller 302 carried by the arm 238 which controls the ball valve 221, will engage the lower stop member 304 and with continued rotation of the plate 201 the arm 238 will be moved to turn the ball valve 221 to the position shown on the right side of FIG. 3 in which the diametric passageway 222 is vertically aligned with the hopper 215 in the magazine 242. As the disc 201 rotates from position E in a clockwise direction, the roller 302 will move over the fixed stop to clear the latter.

Thus, the filling unit is ready to be recharged with material to be packaged. From position E (FIG. 1) the molding elements 75 which are advancing along a straight path, will begin to move away from the lower end of the magazine 242 which is moving in a circular path and as the molding elements 75 and the magazine 242 are completely spaced from each other at such point, such movement will be effected without disruption of the material extending above the upper surface of the molding elements. As the plate continues its rotation and the filling units advance from position E in a clockwise direction toward position A, the hoppers 215 will become aligned with a suitable annular supply hopper (not shown) positioned above the hoppers 215.

As communication is provided between the annular supply hopper, the hopper 215 and through ball valve 221 to the magazine 242, the latter will be charged with the material to be packaged. By reason of the relatively small passageway 277, no material will fall therethrough. As suction is applied from arcuate groove 292 in manifold disc 283 to the associated port 263 of the valve unit 254 and through open valve 267 and port 253 to port 252 of the casing 211, a partial vacuum is created in the interior of the latter. Although the material will fall by gravity into the magazine 242, such vacuum applied through porous ring 246 and passageway 223 into passageway 222 will enhance the rate of fall of the material from the hopper 215 into the magazine 242 to speed up the charging cycle. By reason of the porous ring 246, none of the material to be packaged will pass therethrough.

In addition to such vacuum reducing the time for the charging cycle, where material such as brown sugar is being packaged, the vacuum will prevent clogging of such material due to the binding effect to the molasses therein. Furthermore, it tends to eliminate segregation or unmixing of fine and less fine particles or unmixing of smooth particles from rough or flaky particles.

As the plate 201 rotates, the filling units will advance toward position A. As the filling unit advances from position H to position A, the ball valve will be rotated through an angle of 90 degrees as previously described, and as the filling unit is advanced from position A toward position B, the molding element 75 will be raised by the upwardly inclined track, also in the manner previously described to provide a continuous operation.

After the charged molding elements 75 move away from the filling units, they will advance toward the cover member forming and applying station V (FIGS. 1 and 5). At this station the strip 332 of plastic material retained against the periphery of drum 324 by the belt 329 was heated and softened by heating member 331 so that upon application of suction to annular groove 324 through the associated manifold 323, such softened strip material was drawn into the cavities 77' in the drum 324 to form the trough-shaped cover members 22 (FIG. 19) which will thus far be in a continuous strip.

As the drum 324 shown in FIG. 5 is rotating in a counterclockwise direction in timed relation with the movement of the molding elements 75 which are moving to the right, the portions of the strip 332 on the periphery of the drum between adjacent cavities 77' therein as well as at the ends of each cavity will engage the corresponding portions of the strip 121 between adjacent cavities 77 in each molding element 75 as well as the portions of strip 121 at each end of the cavities 77. As the periphery of the drum between adjacent cavities, as well as at the ends thereof is desirably heated by suitable heating elements H, the strip of plastic material extending across such heated portions of the periphery of drum 324 will be retained in softened condition so that when pressed against the portion of the strip 121 around the periphery of the cavities in each molding element 75, the two strips will bond together to seal the containers defined by the base and cover members.

It is to be noted that as the portion 35a of the fin 35 of the cover member is in the associated recess 320 in drum 321, it will not be pressed against the associated portion of fin 34 of the base member and hence will not adhere thereto. However, as the ends of the cover member 22 will adhere to the wax coated surface of the legs 43 of the reinforcement member, an airtight bond will still be formed even at the region of the unsecured portion 35a.

Thus, with continued rotation of the drum 321 and movement of the molding elements 75, the cover members 21 formed in the drum will be continuously bonded to the base members 22 in the molding elements.

As the cavities 77' in the drum 321 are substantially identical to the cavities 271 in the magazine 242, the portions of the compacted material protruding from the base members 21 will not be disturbed as pressure is only applied against the plastic material around the peripheries of the cavities in the molding elements 75 by the drum 342. Furthermore, as the end walls 31 of the cover member 22, applied by drum 321 will press against the outer surface of the legs 43 of the reinforcement member 41, the ends of the packaged material will also not be disturbed.

As the end walls of the cavities 77' in the drum 321 are desirably tapered slightly, when the drum rotates to move the cavities therein away from the advancing molding elements 75 there will be no disturbance of the material protruding above the molding element 75, for the cavities 77' in the drum will readily clear the cover member 22 which has been applied to the base member 21 and adhered thereto.

With continued advance of the molding elements by the conveyor, the material thus far packaged will be advanced to the second cutting station VI which, as shown in FIG. 11, has four cutting wires 334 extending transversely across the line of moving molding elements spaced 90 degrees apart.

As the cutting member 331 is rotating in timed relation with the movement of the molding elements, it is apparent that the wires which are heated in suitable manner, will engage the spans of strip material 121, 332 between adjacent cavities in the molding element as well as the span of strip material 332 between adjacent molding elements so that the continuous strip of material from the cover member forming unit V will be severed as will be the previously severed portions of the strip which forms the base member. Consequently, after the molding elements pass the second cutting station VI, individual packages P will be provided, each in its separate cavity in the molding elements.

The completed packages are advanced by the molding elements 75 to the package removing station VII shown in FIGS. 2 and 6. At this station the blocks 341 carried by the sprocket chains 339 are superimposed over the cavities in the molding elements 75 so that the triangular recesses 342 in the blocks are juxtaposed over the upstanding triangular portions of the completed packages. As the sprocket chains 339 are moving in timed relation with movement of the molding elements 75, when the blocks 341 pass beneath the suction chamber 345 shown in FIG. 6, as the result of the suction applied to the passageways 348 in the blocks, the packages P will be retained in the triangular cavities 342 in such blocks. Consequently, when the molding elements are lowered as shown in FIG. 6, by reason of the riding of the rollers 108 thereon down an inclined portion of the track, the packages will be removed from the molding elements 75 being retained in the triangular recesses 342 in blocks 341.

The molding elements 75 are lowered sufficiently before they are moved in a circular path as shown in FIG. 2 so that they will not abut against the packages P retained in the blocks 341, which is moving along a straight line. When the belts 339 carrying the blocks 341 has advanced the latter past the suction chamber 345, they will thereupon be positioned over the troughs 349 in conveyor belt 348 and as suction has ceased, the individual packages P will drop into an associated trough to be carried away by said conveyor belt 348.

When the molding elements are at the position just before they start their circular movement as shown in FIG. 2, the cross piece 102 thereof will be engaged by the tooth 114 of the associated sprocket wheel 112 so that as the molding elements thereupon move in a circular path, they will be spaced equally by an angle of 45 degrees. Thus, when the molding element reaches the inlet to the base member forming station I (FIG. 2), it will be aligned with the strip 121 so that the latter will be accurately positioned on the top of the molding element to form the base member in a manner previously described.

With the equipment above described, packages that are in the form of a parallelepiped may readily be formed. As no pressure is exerted against the material in the container defined by the base and cover members 21 and 22, after such container has been charged, the material which is compacted, though it is still moldable, will not be disturbed.

As the cover member 22 when positioned over the extending portion of the compacted material is still soft, it will adhere at its ends to the portions 46 of the legs 43 of the reinforcement member 41 so that the sheet material encompassing the compacted contents of the container will be securely retained in place without likelihood of slippage.

By reason of the unsecured portion or tab 35a, it is a readily simple matter for the package to be opened. Thus, by pulling the portion 35a toward the apex of the leg 43 of the reinforcement member 41 in cover member 22, the plastic material may be stretched until it is clear of the portion 46 of said leg 43. Such stretching without tearing of the material is effected by reason of the fact that the plastic bonds releasably to the wax coating on the leg 43 of the reinforcement member. Thereupon, the portion 46 may be bent outwardly along score line 44 to provide a mouth for removal of the contents of the package.

When the desired quantity has been removed from the package, the leg portion 46 may be moved inwardly and the plastic material restored to again close the package.

As the packages thus formed have no end folds, no trapping will occur of any of the material being packaged.

Although the equipment above described has been shown as forming packages that are square in cross section, it is of course to be understood that packages having other configurations could be made. Thus, for instance, if desired, the magazine could be designed to charge the molding elements only up to the level of their top surface and with the reinforcement member eliminated, the cover forming station could apply a flat strip of plastic material over the top surface of the molding elements so that when the plastic strips are severed a package will be formed that is triangular in cross section.

With the equipment above described, a completely automatic package forming, filling and sealing operation may be performed producing uniform sized packages with substantially equal weights of material, regardless of variations of density of the material from batch to batch and as the equipment operates continuously, packages may be completed at a relatively high rate of speed. The number of packages that may be produced is of course dependent upon the rate of movement of the conveyor belts and if desired, each molding element may have more than two molding cavities therein charged from a single filling unit.

Furthermore, by reason of the compacting of the non-form retaining material, a given weight of material will occupy a considerably smaller volume than the corresponding non-compacted weight of the same material.

Thus for certain pulverulent materials compacted at a pressure of 100 p.s.i., for example, the volume of the package may be approximately 60 percent of the volume of an equivalent weight of non-compacted material. Consequently, the amount of shelf space to store and display the packages is greatly reduced as is the quantity of material to form the container.

In addition, as interstitial spaces are reduced to a minimum, and as there is substantially no head room, there will be little air with its entrained water vapor in the completed package which gives increased flexibility in the type and formulation of materials that can be packaged.

As many changes could be made in the above method and construction, and many apparently widely different embodiments of this invention could be made without departing from the scope of the claims, it is intended that all matter contained in the above description or shown in the accompanying drawings shall be interpreted as illustrative and not in a limiting sense.

I claim:

1. Equipment of the character described comprising a conveyor carrying a plurality of molding elements, each having a molding cavity therein, and a cover member forming unit comprising a plurality of molding elements, each having a molding cavity therein, said cavities having porous walls for flow of gas therethrough, means for supplying a thin strip of thermo-plastic material to said molding elements in a position overlying molding elements on said conveyor and molding elements of said forming unit, means for clamping such strips to said molding elements at the periphery thereof, means for heating and softening said strips, means for exerting suction through said porous walls to draw such softened strips into the associated molding cavity to define a trough-shaped base member and cover member respectively, a filling head overlying said molding elements on said conveyor, means to effect relative movement between said filling head and said molding elements to effect a seal between the filling head and the periphery of a base member in a molding element aligned with said filling head, means in said filling head to force material therefrom into the trough of said base member to fill such trough in compacted form within the boundaries thereof and to protrude above said base member also in compacted form, said molding cavity in the cover member forming unit being complementary with the protruding portion of the material being packaged, means to move the molding elements of said cover member forming unit toward the molding elements on said conveyor to position the cover member over the protruding portion of the material in said base member and means to seal the peripheries of said base and said cover members.

2. Equipment for continuously forming and filling packages, comprising an endless conveyor, a multiplicity of molding elements carried by said conveyor, each of said molding elements having a molding cavity therein, a base member forming station comprising means movable in timed relation to the movement of said conveyor to apply a thin strip of thermo-plasite material to the successive molding elements as they are advanced, in a position overlying the cavities therein and to clamp said strip to said molding elements, means for heating and softening said strip and means for drawing said strip into the associated cavity to define a trough-shaped base member, means for severing the span of strip material between adjacent molding elements, a filling station comprising means movable in timed relation with the movement of the conveyor to introduce flowable material into the base member, means after the base member has been filled to apply a cover member over the filled base member and means after the base member has been covered to remove the filled and covered base member from the cavity in the associated molding element.

3. The combination set forth in claim 2 in which the conveyor has a portion along which the molding elements are moved along a straight path and a portion along which the molding elements are moved along an arcuate path, the base member forming station is located at the first mentioned portion of the conveyor and the filling station is located at the last named portion of the conveyor.

4. The combination set forth in claim 3 in which the conveyor comprises a pair of spaced upright members, an endless member encompassing said upright members and having portions along which the molding elements are moved along straight paths and arcuate paths, and means to reciprocate said molding elements as they are advanced by the conveyor.

5. The combination set forth in claim 2 in which the conveyor has a portion along which the molding elements are moved along a straight path, the base member forming station is positioned at such portion, and comprises an endless belt having a lower run adapted to move parallel to and in juxtaposition with the top surface of the molding elements, said strip of sheet plastic material being applied between the lower run of said endless belt and the top surfaces of the associated molding element.

6. The combination set forth in claim 2 in which the conveyor has a portion along which the molding elements are moved along a straight path, the base member forming station is positioned at such portion and comprises an endless belt having a lower run adapted to move parallel to and in juxtaposition with the top surface of the molding elements, said strip of plastic material being applied between the lower run of said endless belt and the top surfaces of the associated molding elements, each of the molding elements having a passageway leading from a wall thereof into the associated cavity and the means for drawing the strip into the cavity, comprises a suction unit coacting with the opening in said wall.

7. The combination set forth in claim 6 in which the suction unit comprises an endless perforated belt having a run thereof adapted to engage the wall of said molding elements with which said passageway is in communication and a suction chamber associated with said run of the perforated belt, whereby when suction is applied to said chamber, suction will be applied through the perforations in the belt aligned therewith to create suction in the cavities in the associated molding elements.

8. The combination set forth in claim 2 in which means are provided successively to introduce a reinforcement member into the base members in the cavities of said molding elements as the latter are advanced by said conveyor.

9. The combination set forth in claim 2 in which the conveyor has a portion along which the molding elements are moved along a straight path and means are provided at such portion successively to introduce a reinforcement member into the base members in the cavities of said molding elements as the latter are advanced by said conveyor.

10. The combination set forth in claim 2 in which the conveyor has a portion along which the molding elements are moved along a straight path, means are provided successively to introduce a reinforcement member into the base members in the cavities of said molding elements as the latter are advanced by said conveyor, said means comprising a rotatable member having a plurality of teeth on its periphery each complementary to the cavities in the molding elements and adapted successively to enter such cavities as the molding elements are advanced by the conveyor, means successively to position a reinforcement member on the teeth of said rotatable member, means to retain such reinforcement member against such teeth and means to release such reinforcement member when the tooth on which it is positioned has entered an associated cavity.

11. The combination set forth in claim 2 in which the conveyor has a portion along which the molding elements are moved along a straight path, means are provided to introduce a reinforcement member having a cross piece and a pair of legs into the base members in the cavities of said molding elements as the latter are advanced by said conveyor, said means comprising a rotatable member having a plurality of circumferentially spaced teeth on its periphery each complementary to the cavities in the molding elements and adapted successively to enter such cavities as the molding elements are advanced by the conveyor, means successively to position the cross piece of such reinforcement member on the teeth of said rotatable member so that the legs of the reinforcement member extend laterally beyond the circumferentially spaced teeth, means to retain such cross piece against such teeth, means to fold the legs downwardly at substantially right angles to the cross piece, means to retain such legs in such position and means to release the reinforcement member when the tooth on which it is positioned has entered an associated cavity in the molding element.

12. The combination set forth in claim 11 in which the rotatable member comprises a pair of spaced discs, each having a plurality of said circumferentially spaced teeth, transversely aligned surfaces of said teeth each having a porous plate against which the ends of the cross piece of the reinforcement member is positioned and the means to retain the cross piece against the teeth comprises means to apply suction to said porous plates.

13. The combination set forth in claim 11 in which the rotatable member comprises a pair of spaced discs, each having a plurality of said circumferentially spaced teeth, transversely aligned surfaces of said teeth each having a porous plate against which the ends of the cross piece of the reinforcement member is positioned and the outer surface of each plate adjacent each tooth having a porous plate against which the legs of said cross piece are positioned and the means to retain the cross piece against the teeth and the legs in position comprises means to apply suction to said porous plates.

14. The combination set forth in claim 11 in which the means to fold the legs of the reinforcement members downwardly comprises a pair of spaced rotatable circular plates straddling the rotatable member, the legs of said reinforcement member abutting against said plates as the rotatable member is rotated.

15. The combination set forth in claim 2 in which the conveyor has a portion along which the molding elements are moved along a straight path, a pair of rollers are provided between which a continuous strip of material is fed, said rollers forming score lines in the strip defining a cross piece and a pair of legs, a pair of rollers between which the strip is fed by the scoring rollers, said last named rollers severing the strip to form reinforcement members, means to introduce a reinforcement member into the cavities of said molding elements as the latter are advanced by said conveyor, said means comprising a rotatable member having a plurality of circumferentially spaced teeth on its periphery, each complementary to the cavities in the molding elements and adapted successively to enter such cavities as the molding elements are advanced by the conveyor, means successively to position the cross piece of such reinforcement member on the teeth of said rotatable member so that the legs of the reinforcement member extend laterally beyond the circumferentially spaced teeth, means to retain such cross piece against such teeth, means to fold the legs downwardly at substantially right angles to the cross piece, means to retain such legs in such position and means to release the reinforcement member when the tooth on which it is positioned has entered an associated cavity.

16. The combination set forth in claim 2 in which the conveyor has a portion along which the molding elements are moved along an arcuate path, a plurality of filling units are associated with such portion and movable in a circular path, each of said filling units having a magazine to be filled with the material to be packaged, means successively to effect seals between said magazines and the base members in said molding elements while said molding elements and filling units are moving and means when said magazine and said base members are in sealing engagement to force material from said magazine into said base members to charge the latter.

17. The combination set forth in claim 2 in which the conveyor has a portion along which the molding elements are moved along an arcuate path, a supporting member rotatable on an axis aligned with the axis of the arcuate path of movement of the molding elements, a plurality of filling units circumferentially spaced on said supporting member, each having a magazine positioned over the molding elements, and adapted to be filled with the material to be packed, a vertically reciprocable mount for each of said molding elements, means successively to raise the molding elements to move the periphery of the base member in the latter into sealing engagement with the magazines and means to thereupon force the material in the magazines into the associated base member to charge the latter.

18. The combination set forth in claim 17 in which the conveyor carries a plurality of mounts, each having a vertical hollow cross piece, a rod is slidably positioned in each cross piece and mounts a molding element at its upper end, and means coacting with the lower end of said rod to raise and lower the latter.

19. The combination set forth in claim 17 in which the conveyor carries a plurality of mounts each having a vertical hollow cross piece, a rod is slidably positioned in each cross piece and mounts a molding element at its upper end, means coacting with the lower end of said rod to raise and lower the latter and means rotatable on the axis of said supporting member to engage the cross piece of said mounts as they move in an arcuate path to space adjacent mounts a predetermined amount.

20. The combination set forth in claim 17 in which each of the filling units has a hopper, and a valve controlling communications between said hopper and the associated magazine, and means controlled by the rotation of said supporting member to actuate said valve to cut off communication between said hopper and said magazine prior to movement of the associated molding element to effect sealing engagement of said base member with the magazine and to actuate said valve to provide communication between said hopper and said magazine after the material in the latter has been forced into the base member.

21. The combination set forth in claim 17 in which each of the filling units has a hopper and a filling valve controlling communication between said hopper and the associated magazine, means controlled by the rotation of said supporting member to actuate said valve to cut off communication between said hopper and said magazine prior to movement of the associated molding element to effect sealing engagement of said base member with said magazine and to actuate said valve to provide communication between said hopper and said magazine after the material in the latter has been forced into the base member, and means controlled by the rotation of said supporting member to apply a source of gas under pressure through said filling valve to force the contents of the magazine into the base member.

22. The combination set forth in claim 2 in which the conveyor has two portions along which the molding elements are moved in a straight path and a portion between said two portions along which the molding elements are moved in an arcuate path, the base member forming station and the severing means are located along one of said straight paths, the filling station is located along the arcuate path and the means to apply the cover member is located along the other of said straight paths.

23. The combination set forth in claim 22 in which the means to apply the cover member comprises a drum having a plurality of cavities therein complementary to the cavities in the molding elements, said drum being positioned over said molding elements with a portion thereof in juxtaposition thereto, means to apply a strip of thermo-plastic material to overlie the cavities in the drum, means to heat and soften such strip, means to draw such softened strip into the drum cavity to form the cover member and means after the cover member has been applied to the base members to sever the span of strip material between adjacent cavities in the molding elements.

24. The combination set forth in claim 2 in which the conveyor has a portion along which the molding elements are moved in a straight path, the means to apply the cover member comprises a drum having a plurality of cavities therein complementary to the cavities in the molding elements, said drum being positioned over said molding elements with a portion thereof in juxtaposition thereto, means to apply a strip of thermo-plastic material to overlie the cavities in the drum, means to heat and soften such strip, means to draw such softened strip into the drum cavities to form cover members and means after the cover member has been applied to the base member to sever the span of strip material between adjacent cavities in the molding elements to form the completed packages, the means to remove a filled and covered base member comprising an endless belt having a lower run thereof movable in the same direction as said molding elements, the lower run of said endless belt having a plurality of cavities therein complementary to the cover member portion of the packages and adapted to successively encompass the latter as said lower run and said molding elements advance, means to retain the packages in the cavities in said belt, means to move said molding elements so that they are clear of said belt, and means to thereupon discharge the contents of the cavities.

25. The combination set forth in claim 24 in which the means to retain the packages in the cavities in said belt comprises a source of suction, and means to apply such suction to such cavities.

26. The combination set forth in claim 22 in which the means to apply the cover member comprises a drum having a plurality of cavities therein complementary to the cavities in the molding elements, said drum being positioned over said molding elements with a portion thereof in juxtaposition thereto, the periphery of said drum at one end thereof having recesses therein aligned respectively with the ends of said cavities, an endless belt adapted to engage the periphery of said drum, said belt having spaced protuberances adapted to seat in the recesses in said drum, means to apply a strip of thermo-plastic material between the belt and the periphery of said drum to overlie the cavities in said drum and the recesses in the end wall thereof, means to heat and soften such strip, means to draw such softened strip into the drum cavity to form the cover member and means after the cover member has been applied to the base member to sever the span of strip material between adjacent cavities in the molding elements.

27. Equipment for filling containers comprising an endless conveyor for receiving a plurality of receptacles to be filled, said conveyor being movable through an endless path, at least a part of which is arcuate, a plurality of filling units adjacent to said portion of said path and movable in a path concentric with said curved portion, each of said filling units including a magazine having a filling opening to receive comminuted material and a discharge opening for filling said comminuted material into said receptacles, means to effect seals successively between said magazines and said receptacles while said magazines and said receptacles are moving together along said arcuate portion of said path, means for opening and closing said filling opening and means for applying gas at superatmospheric pressure to said material for forcing said comminuted material from said magazine into said receptacle while they are sealed to each other and said filling opening is closed.

28. The equipment set forth in claim 27 in which each of said filling units includes a hopper and said means for opening and closing said filling opening comprises a valve controlling communication between said hopper and the magazine of the filling unit, and means controlled by movement of said filling units to actuate said valve to afford communication between said hopper and said magazine while said magazine is not sealed to a receptacle and to cut off communication between said hopper and said magazine prior to effecting a seal between a receptacle and said magazine and while they are sealed.

29. Equipment for filling containers comprising a conveying member movable through an endless path for receiving receptacles and moving them along at least a portion of said path, at least one filling unit including a hopper for receiving comminuted material to be filled into said receptacles, a magazine having a discharge opening and a filling opening, and a valve interposed between said filling opening and said hopper for affording communication between the hopper and the magazine to enable said comminuted material to flow from said hopper into said magazine and shutting off communication between them, means supporting said unit for movement along a path at least in part coinciding with said portion of said path of said conveying member, means for effecting a seal between the magazine and a receptacle around said discharge opening during movement along the coinciding parts of said paths and thereafter separating said receptacle from said magazine, means for actuating said valve for shutting off communication between said hopper and said magazine prior to effecting said seal, and means for applying gas under pressure to said comminuted material in said magazine while the latter is sealed to a receptacle to discharge material through said discharge opening into said receptacle, said valve being actuated by said valve actuating means to afford communication between said magazine and said hopper when the magazine is separated from said receptacle.

30. The equipment set forth in claim 29 in which a portion of the endless path through which said conveying member moves said receptacles is arcuate, and the coinciding part of the path of the filling unit is concentric with said portion.

31. The equipment set forth in claim 29 in which said means supporting said filling unit is a rotary member and comprising a plurality of said filling units mounted in angularly spaced relation around the periphery of said rotating member.

References Cited in the file of this patent

UNITED STATES PATENTS

| | | |
|---|---|---|
| 1,186,481 | Kaye | June 6, 1916 |
| 2,152,339 | Anderson | Mar. 28, 1939 |
| 2,603,927 | Grey | July 22, 1952 |
| 2,904,945 | Kerr | Sept. 22, 1959 |